United States Patent [19]

Nemoto et al.

[11] 4,274,727
[45] Jun. 23, 1981

[54] FAIL-SAFE SYSTEM FOR THE ELECTRONIC SHUTTER OF A CAMERA

[75] Inventors: Ichiro Nemoto; Eiichi Onda, both of Yotsukaido, Japan

[73] Assignee: Seiko Koki Kabushiki Kaisha, Tokyo, Japan

[21] Appl. No.: 85,465

[22] Filed: Oct. 17, 1979

[30] Foreign Application Priority Data

Oct. 23, 1978 [JP] Japan ............................ 53-145635[U]

[51] Int. Cl.³ .............................................. G03B 9/08
[52] U.S. Cl. ..................................... 354/234; 354/266
[58] Field of Search ........................ 354/234, 266–268, 354/258

[56] References Cited

U.S. PATENT DOCUMENTS 3,947,858  3/1976  Ishida ................................... 354/234
4,024,553  5/1977  Maitani et al. .................... 354/268 X Primary Examiner—John Gonzales
Attorney, Agent, or Firm—Robert E. Burns; Emmanuel J. Lobato; Bruce L. Adams

[57] ABSTRACT

This invention relates to an electronic shutter of a camera provided with a fail-safe system. An electromagnet is connected to the output of an electronic delay circuit. An armature lever moves in the direction to separate from the electromagnet to effectuate the shutter closing operation when the electromagnet is demagnetized. A shutter regulating member starts operation as it is released from restraint in connection with a shutter release operation to cancel a force pressing the armature lever against the electromagnet and to effectuate the shutter opening operation. A stopping means is provided for the shutter regulating member and the armature lever. The stopping means is capable of interrupting the movement of the shutter regulating member and the armature lever before the shutter opening and the shutter closing operation is started. The stopping means interrupts the movement of the shutter regulating member and the armature lever when the electromagnet is not magnetized normally so that the shutter will not be operated. The armature lever is externally operative by means of an operating member. The shutter can be manually operated by means of the operating member.

6 Claims, 3 Drawing Figures

FAIL-SAFE SYSTEM FOR THE ELECTRONIC SHUTTER OF A CAMERA

BACKGROUND OF THE INVENTION

This invention relates to a fail-safe system for the electronic shutter of a camera of the type that actuates the shutter closing operation to complete exposure by demagnetizing an electromagnet connected to the output of an electronic delay circuit.

The conventional electronic shutter of this type has a disadvantage that the necessary exposure time is not obtained as the shutter closing operation is performed immediately after the initiation of the shutter opening operation when the electromagnet is inoperative due to failure properly install a battery in the camera, voltage drop of the power source or trouble in the camera electronic circuit. In order to overcome this disadvantage, a method has been introduced to notify the operator of the abnormality of the system when the electromagnet is inoperative by providing a member to automatically interrupt the shutter operation, however, this method is economically disadvantageous requiring complex structure.

An object of the present invention is to overcome aforesaid disadvantage of the conventional electronic shutter and to provide an electronic shutter for a camera of simple construction and capable of notifying the operator of abnormal shutter operation while interrupting the operation of the shutter when the electromagnet is found inoperative and furthermore, which is capable of optional mechanical time regulation of the shutter operation by an external control operation.

BRIEF DESCRIPTION OF THE DRWAINGS

Detailed explanation on the present invention will be made hereinafter referring to the attached drawings.

Figure 1:
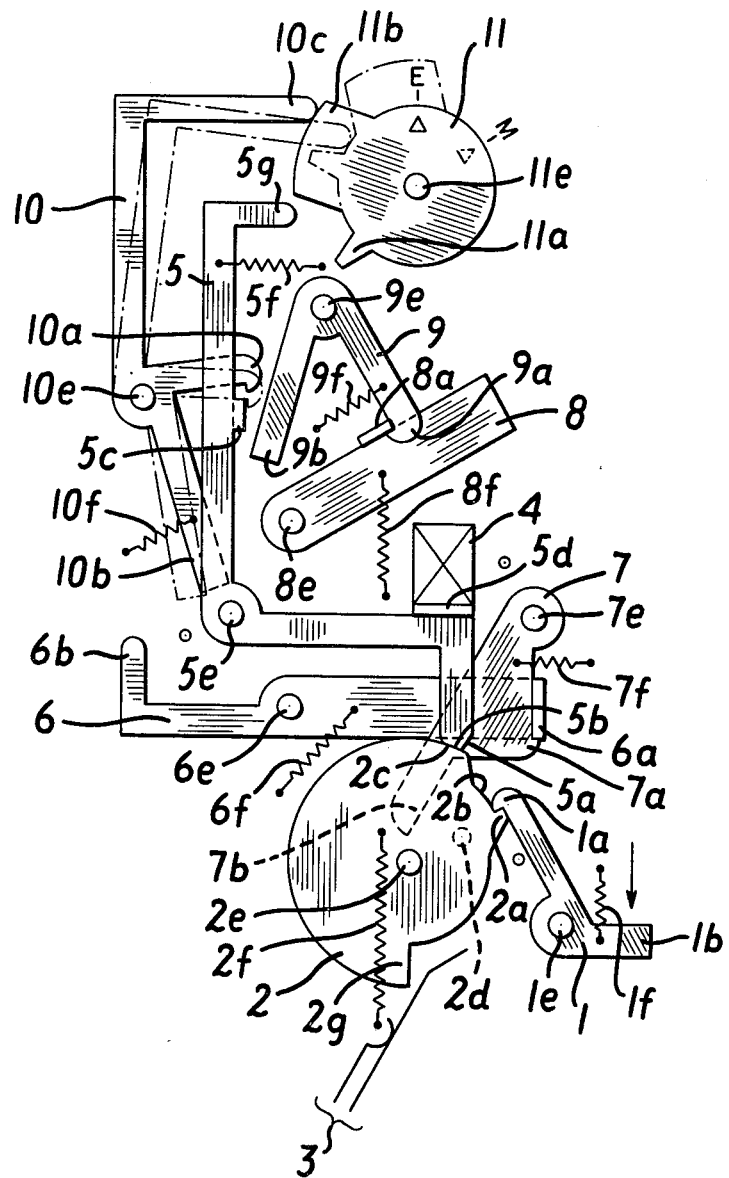
FIG. 1 illustrates the shutter system in the charged state.

A shutter release lever (1) having a hooked end (1a) and an arm (1b) is pivoted about a shaft (1e) and urged counterclockwise by a spring (1f). A shutter regulating member (2) having a protrusion (2a), a face (2b), pushing parts (2c) and (2g) and a reverse projection (2d) is pivoted about a shaft (2e) and urged counterclockwise by a spring (2f). A trigger switch (3) actuates the electronic delay circuit, not shown. An electromagnet (4) is connected to the output of the electronic delay circuit. An armature lever (5), having a hooked end (5a), arms (5b) and (5g), a reverse arm (5c) and an armature (5d) which is attracted to the electromagnet (4) when the electromagnet is magnetized, is pivoted about a shaft (5e) and urged clockwise by a spring (5f). An opening lever (6), having a bent (6a) and an arm (6b), is pivoted about a shaft (6e) and urged clockwise by a spring (6f) so as to drive the shutter blade, not shown, to open. An opening hook (7) for retaining the opening lever (6) at the charged position, having a retaining side (7a) and an arm (7b), is pivoted about a shaft (7e) and urged counterclockwise by a spring (7f) which is weaker than the spring (2f) for the shutter regulating member. A closing lever (8) for driving the shutter blade, not shown, to close, having a retaining part (8a), is pivoted about a shaft (8e) and urged clockwise by a spring (8f). A closing hook (9) for retaining the closing lever (8) at the charged position, having a retaining part (9a) and an arm (9b), is pivoted about a shaft (9e) and urged clockwise by a spring (9f) which is weaker than the spring (5f) for the armature lever (5). A mechanical time regulating lever (10), having a retaining part (10a), arms (10b) and (10c), is pivoted about a shaft (10e) and urged clockwise by a spring (10f) which is weaker than the spring (7f) for the opening lever (7). An operating member (11) for externally operating the armature lever (5), having a cam portion (11a) for controlling optional mechanical exposure time and a cam portion (11b) for regulating the mechanical time regulating lever (10) for controlling mechanical exposure time of a fixed shutter speed, is pivoted about a shaft (10e). In FIG. 1, the continuous line indicates the electronic exposure control mode and the alternate long and short dash line indicates the mechanical exposure control mode with a fixed shutter speed.

The manner of operation of the system will be described hereinafter.

Figure 2:
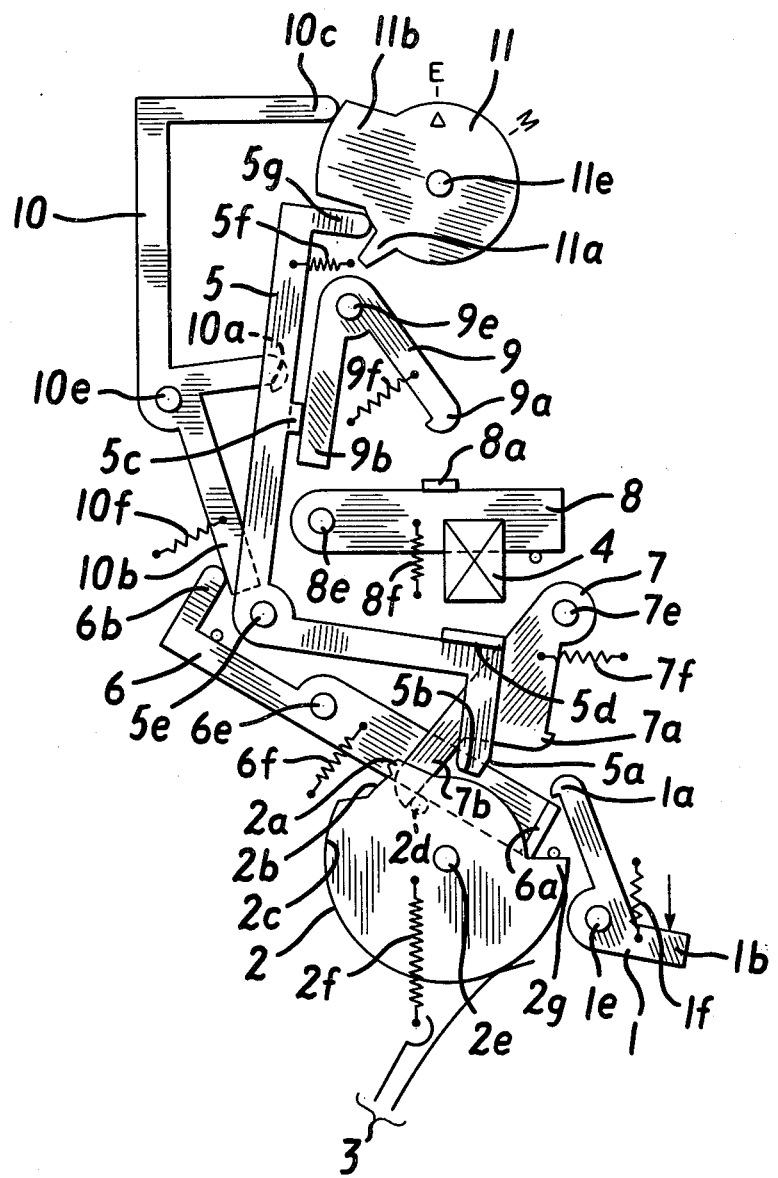
FIG. 2 illustrates the shutter system in the state just after the exposure operation has been completed.

First explanation will be made of the operation of the system in the electronic exposure control mode when the electromagnet is operation normally. Starting from the shutter-charged state as shown in FIG. 1, first the power source is connected to the electronic delay circuit, not shown, to magnetize the electromagnet (4) in coordination with a shutter release operation, then the arm (1b) of the release lever (1) is pushed in the direction of the arrow to turn the release lever clockwise in coordination with the release operation or the mirror lifting motion of a single lense reflex camera so that the shutter regulating member (2) is released. The shutter regulating member (2) starts turning counterclockwise being pulled by the spring (2f). As the shutter regulating member turns, first the shutter regulating member (2) opens the trigger switch (3) to actuate the electronic delay circuit, then the pushing part (2c) escapes from the armature lever (5) so that the pushing force pushing the armature (5d) of the armature lever (5) against the electromagnet (4) is cancelled, however, the armature lever (5) remains attracted to the electromagnet (4) as the electromagnet (4) has previously been magnetized since the power source was connected to the electronic delay circuit. As the shutter regulating member is turned counterclockwise further, the reverse projection (2d) pushes the arm (7b) of the opening hook (7) to turn the opening hook (7) clockwise so that the opening layer (6) is released. Then the opening lever (6) is allowed to turn clockwise being pulled by the spring (6f) to drive the shutter blade, not shown, to open and start exposure. When the electromagnet (4) connected to the output side of the electronic delay circuit is demagnetized after a fixed period of time, the armature lever (5) is allowed to turn clockwise being pulled by the spring (5f) so that the arm (5c) pushes the arm (9b) of the closing hook (9) to turn the closing hook (9) counterclockwise releasing the retention of the closing lever (8). Then the closing lever (8) drives the shutter blade, not shown, to close to complete the exposure. FIG. 2 illustrates the shutter control system in the state that the exposure operation has just been completed.

Figure 3:
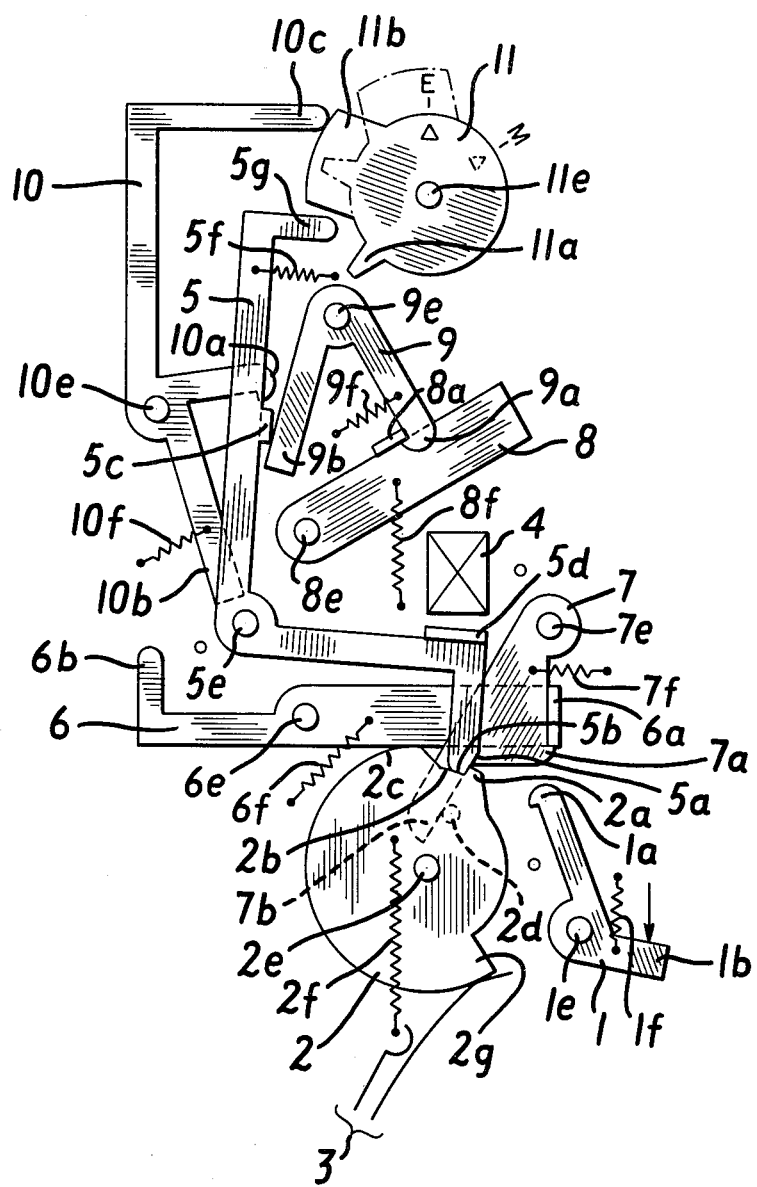
FIG. 3 illustrates the shutter system in the state where the shutter operation is interrupted when the electromagnet does not function normally after the shutter has been released.

The following explanation relates to the operation of the electronic exposure control system when the electromagnet does not function normally. Starting from the shutter-charged state as shown in FIG. 1, as the release lever (1) releases the retention of the shutter regulating member (2) allowing counterclockwise turning of the shutter regulating member (2) by the spring (2f), the shutter regulating member (2) first opens the trigger switch (3), then the pushing part (2c) escapes from the armature lever (5) so that the pushing force pushing the armature lever (5) against the electromagnet (4) is cancelled. In this case, the electromagnet being not magnetized and not attracting the armature lever (5), the armature lever (5) turns clockwise being pulled by the spring (5f) as the end of the arm (5b) follows the contour of the shutter regulating member (2) until the hooked end (5b) is engaged with the protrusion (2a) of the shutter regulating member (2) to interrupt further turning of the shutter regulating member (2). FIG. 3 illustrates the state in which the turning of the shutter regulating member (2) has just been interrupted after the aforesaid operating sequence. The retention of the opening lever (6) is not released, consequently, the exposure operation will not be performed as the turning of the shutter regulating member (2) is interrupted by the armature lever (5). On the other hand, further clockwise turning of the armature lever (5) being interrupted by the engagement of the face (2b) of the shutter regulating member (2) with the arm (5b), the reverse arm (5c) will not push the closing hook (9) so that the closing operation of the closing lever (8) will not be performed. This interruption notifies the operator of the abnormal operation of the electromagnet by obstructing the film-winding motion or arresting the mirror lifted in the camera using the shutter closing operation as a signal for film-winding or the mirror-down motion of the single lense reflex camera.

Starting again from the state as shown in FIG. 3, as the armature lever (5) is turned counterclockwise being pushed at the arm (5g) by the cam portion (11a) by turning the operating member (11) clockwise, the retention of the shutter regulating member (2) is released so that the shutter regulating member (2) is allowed to turn counterclockwise being pulled by the spring (2f). Consequently, the reverse projection (2d) pushes the arm (7b) of the opening hook (7) turning the opening hook (7) clockwise, then the retention of the opening lever (6) is released to start exposure. As the operating member (11) is turned clockwise or counterclockwise as far as the cam portion (11a) escapes from pushing the armature lever (5), the armature lever (5) is allowed to be turned by the spring (5f) clockwise, then the arm (5c) pushes the arm (9b) of the closing hook (9) to turn the closing hook (9) counterclockwise releasing the retention of the closing lever (8) so that the exposure is completed. The long and short dash line in FIG. 3 show the position of the member (11) when the system is arranged to complete exposure by turning the operating member (11) clockwise. In controlling the initiation and the completion of exposure by turning the operating member (11), the exposure time can be optionally determined corresponding to the operating speed by operating the operating member slowly or quickly. This function is effective as a fail-safe system when the electromagnet does not function normally and also is possible to apply to the mechanical time exposure arrangement.

The following explanation relates to operation of the system according to the present invention as performing exposure time regulation for a fixed shutter speed. In the shutter-charged state as shown in FIG. 1, the operating member (11) and the mechanical time regulating lever (10) are put at the position represented by long and short dash lines. In this position, the operating member (11) is adapted to cut-off power supply to the electronic delay circuit, not shown, and the mechanical time regulating lever (10) retains the armature lever (5) with the retaining part (10a) engaging with the arm (5c). When the shutter regulating member (2) is released by turning clockwise the release lever (1) in this state, the shutter regulating member (2) starts turning counterclockwise being pulled by the spring (2f). During the counterclockwise turning, the shutter regulating member first opens the trigger switch (3), however, the electronic delay circuit will not be actuated because the operating member (11) has previously cut-off power supply to the electronic delay circuit. As the shutter regulating member (2) continues to turn, the face (2b) escapes from the armature lever (5) releasing the pushing force pressing the armature lever (5) against the electromagnet (4), then the armature lever (5) starts turning clockwise being pulled by the spring (5f) as the electromagnet is not magnetized. In the initial phase of turning, the mechanical time regulating lever (10) interrupts the turning of the armature lever (5) with the retaining part (10a). As the shutter regulating member (2) continue to turn, the reverse projection (2d) pushes the opening hook (7) at the arm (7b) to release the opening lever (6), then the opening lever (6) starts turning clockwise being pulled by the spring (6f) to drive the shutter blade, not shown, so that exposure starts. As the opening lever (6) has reached a prescribed operating range, the arm (6b) pushes the mechanical time regulating lever (10) at the arm (10b) to turn the mechanical time regulating lever (10) counterclockwise so that the retention of the armature lever (5) at the arm (5c) is released. Then, the armature lever (5) starts turning clockwise being pulled by the spring (5f) and pushes the closing hook (9) to release the closing lever (8), so the closing lever (8) is allowed to turn clockwise being pulled by the spring (8f) and drives the shutter blade, not shown, to close so that the exposure is completed.

In charging the shutter after the completion of exposure as shown in FIG. 2, the shutter regulating member (2) is turned clockwise as far as it is retained by the release lever (1) according to the known procedure while the opening lever (6) and the closing lever (8) are turned counterclockwise as far as they are retained by the opening hook (7) and the closing hook (9), respectively as shown in FIG. 1.

The described invention provides a highly effective fail-safe system for the electronic shutter of a camera which interrupts the shutter operation when the electromagnet does not function normally without requiring any additional parts, and furthermore, it provides optional mechanical exposure time control by means of a simple mechanism.

What we claim is:

1. A camera shutter mechanism, comprising: an electromagnet an armature lever mounted for pivoting toward and away from said electromagnetic and having an armature which is attracted by said electromagnetic when said electromagnet is energized for holding said armature lever against said electromagnet; a movable shutter regulating member enagagable with said armature lever and movable between a charged position forcing said armature against said electromagnet and a second position at which said armature lever is free to pivot away from said electromagnet and at which said shutter regulating member effectuates shutter opening;

means urging said armature lever away from said electromagnet when said electromagnet is deenergized toward a position where said armature lever effectuates shutter closing; stopping means for stopping movement of said shutter regulating member and for stopping movement of said armature lever prior to shutter opening when said electromagnet is insufficiently energized to hold said armature from pivoting away from said electromagnet to the position where said armature lever effectuates shutter closing; and an operating member movable to and from a position at which said armature lever is moved by said operating member towards said electromagnet to permit said shutter regulating member to continue pivoting to effectuate shutter opening after said shutter regulating member had been stopped by said stopping means.

2. A camera shutter mechanism according to claim 1, wherein said operating member is movable into and out of another position in which power to said electromagnet is cut off.

3. A camera shutter mechanism according to claim 1, further comprising: an exposure time regulating lever mounted for pivoting between a first position where said regulation lever is ineffective to regulate exposure time and a second position where said regulating lever is effective to regulate exposure time, said regulating lever including holding means for holding said armature lever against said electromagnet when said regulating lever is in the second position and for releasing said armature lever when said regulating lever moves from the second to the first position; a shutter opening lever cooperative with said shutter regulating member for being released when said shutter regulating member moves to a position for effectuating opening of a shutter, said opening lever including means for moving said regulating lever from the second to the first position when said opening lever has completed shutter opening; and said operating member including means for holding said regulating lever in the first position when said operating member is positioned for automatic exposure time control and for releasing said regulating lever to travel to the second position when said operating member is positioned to permit exposure time to be mechanically controlled.

4. A camera shutter mechanism according to claim 3, wherein said operating member is mounted for rotation about an axis and includes a protrusion extending toward and abutting said regulating lever for holding said regulating lever in the first position, and said operating member being rotatable for releasing said regulating lever from said protrusion to permit said regulating lever to travel from the first to the second position.

5. A camera shutter mechanism according to claim 1, wherein said shutter regulating member is mounted for rotation about an an axis and has a peripheral surface portion facing said armature lever and bearing against said armature level for holding said armature lever against said electromagnet as said shutter regulating member pivots toward a position for effectuating shutter opening, and said stopping means comprises a recess in said peripheral surface portion for receiving said armature lever therein when said shutter regulating member rotates and the recess in said peripheral surface portion passes said armature lever held against said electromagnet by said peripheral surface portion, and said armature lever received within the recess being effective for holding said shutter regulating member from further rotation before said shutter regulating member rotates to a position for effectuating shutter opening.

6. A camera shutter mechanism according to claim 5, wherein said operating member is mounted for rotation about an axis and includes a protrusion, and said operating member being rotatable for engaging said protrusion with said armature lever for releasing said armature lever from said shutter regulating member to permit said regulating member to continue rotation and effectuate shutter release when said electromagnet is deenergized.

* * * * *